United States Patent [19]

Witheford

[11] 3,928,474
[45] Dec. 23, 1975

[54] MANUFACTURE OF GLYCOLS
[75] Inventor: John Maurice Witheford, Wyckoff, N.J.
[73] Assignee: American Cyanamid Company, Stamford, Conn.
[22] Filed: June 21, 1974
[21] Appl. No.: 483,842

Related U.S. Application Data
[63] Continuation-in-part of Ser. No. 273,586, July 20, 1972, abandoned.

[52] U.S. Cl...... 260/635 H; 260/615 R; 260/615 B; 260/633
[51] Int. Cl.² ........................................ C07C 29/02
[58] Field of Search............ 260/636, 635 E, 635 H

[56] References Cited
UNITED STATES PATENTS

| | | | |
|---|---|---|---|
| 1,724,761 | 8/1929 | Holden | 260/638 B |
| 1,982,545 | 11/1934 | Skarbloom | 260/636 |
| 2,378,104 | 6/1945 | Reed | 260/636 |
| 3,629,343 | 12/1971 | Levin et al. | 260/635 E |

Primary Examiner—Joseph E. Evans
Attorney, Agent, or Firm—Harry H. Kline

[57] ABSTRACT

There is provided a process for preparing ethylene glycol by adding about 1 mole of water, from about 0.350 to 0.490 mole of oxygen and an aqueous solution of a catalytic iodine-containing compound selected from the group consisting of iodine, hydrogen iodide, ethylene diiodide and iodoethanol to a first reaction zone, introducing about 1 mole of ethylene and about 0.010 to 0.150 mole of oxygen to a second reaction zone, the amount of oxygen in both zones being equal to about 0.5 mole, withdrawing ethylene from the second reaction from overheads and introducing the same into the said first reaction zone, withdrawing from the first reaction zone a mixture of relatively high boiling organic iodides, iodine and ethylene glycol, introducing the latter mixture into said second reaction zone while maintaining said reaction zones at temperatures ranging from between 75°C. and 175°C. and pressures ranging from between 50 psi and 1,000 psi in each of said reaction zones, withdrawing a mixture of low boiling iodides and ethylene glycol as bottoms from the second reaction zone, subjecting the latter to distillation at a temperature of from 50°C. to 190°C. and under subatmospheric pressure ranging from about 1 mm. Hg. to about 700 mm. Hg., withdrawing as an overhead low boiling iodine compounds which are recycled to the first reaction zone, and recovering as bottoms an ethylene glycol product of markedly improved purity substantially devoid of iodinecontaining catalyst.

2 Claims, 1 Drawing Figure

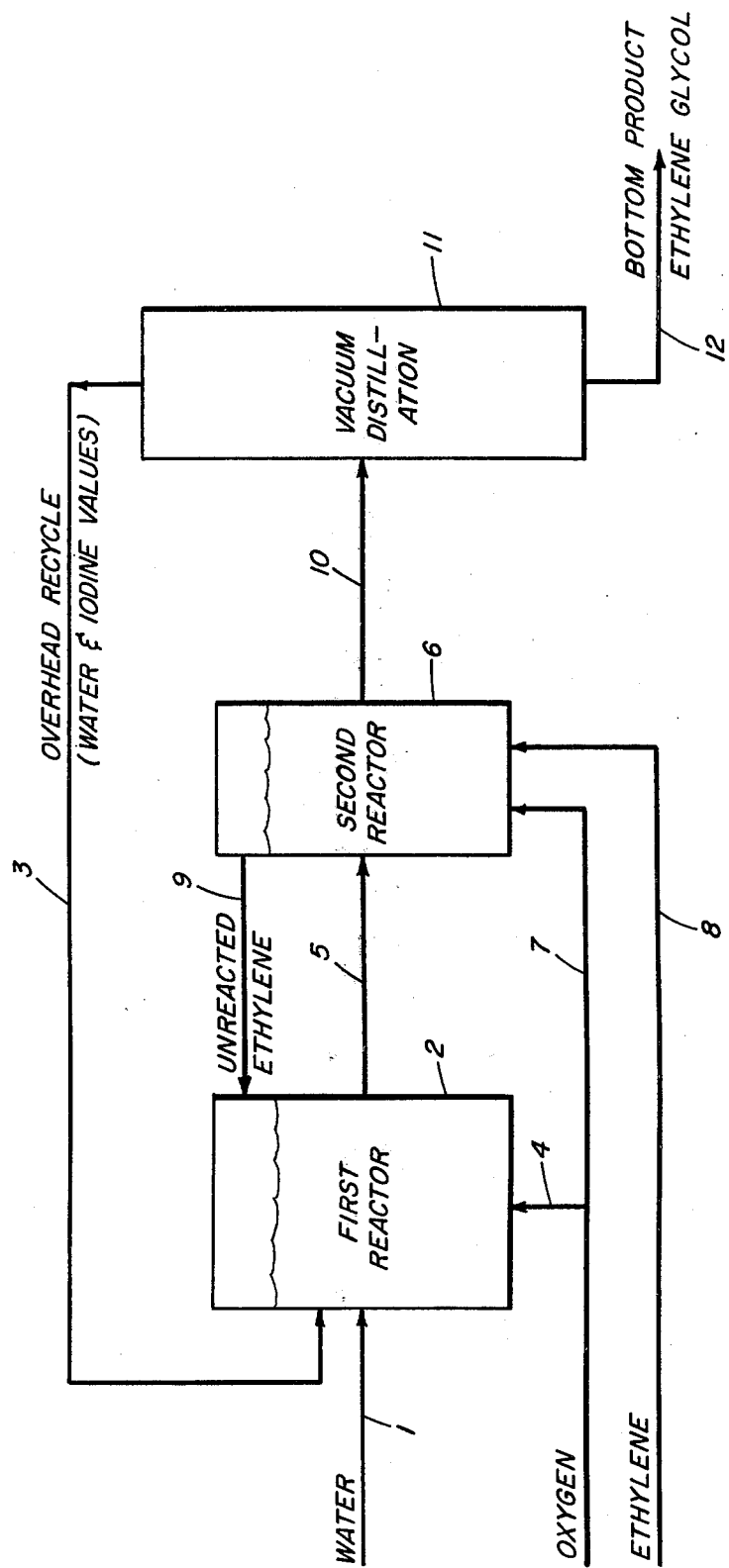

MANUFACTURE OF GLYCOLS

This application is a continuation-in-part of my copending application, Ser. No. 273,586, filed on July 20, 1972, now abandoned.

The present invention relates to the manufacture of ethylene glycol from ethylene, oxygen, and water in the presence of an iodine-containing compound as a catalyst under controlled conditions of temperatures and pressures. More particularly, it relates to the preparation of ethylene glycol having dissolved therein small amounts of diethylene glycol and triethylene glycol utilizing substantially stoichiometric amounts of ethylene, water, and oxygen in the presence of an iodine-containing catalyst dissolved in water, whereby under controlled temperature and pressure conditions, there is obtained ethylene glycol, substantially free from iodine and organic iodides, as well as dissolved diethylene glycol and triethylene glycol.

The manufacture of ethylene glycol is well known. One of the more attractive methods involves the reaction of ethylene, oxygen, and water in the presence of an iodine-containing catalyst for the reason that the reactants are readily available in abundant quantities. The overall reaction may be represented as follows:

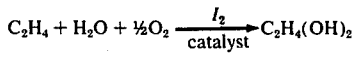

$$C_2H_4 + H_2O + \tfrac{1}{2}O_2 \xrightarrow[\text{catalyst}]{I_2} C_2H_4(OH)_2$$

This process is described, for instance, in the patent to Skärblom, U.S. Pat. No. 1,982,545, in which each of the reactants is fed to a single reactor maintained at a superatmospheric pressure of from about 70 psi. to about 280 psi. and at a temperature in the range of from 90°C. to 130°C. Despite the apparent simplicity of this process, it has not been widely accepted. It appears that the Skärblom process results in ethylene glycol which contains excessive quantities of high-boiling components, such as diethylene glycol, triethylene glycol, as well as relatively high-boiling iodine compounds and free iodine. Thus, the Skärblom process is not wholly satisfactory. This is because the use of a single reaction zone to which ethylene and oxygen are fed in the stoichiometric proportions required for the reaction leads to a reaction product which contains a high concentration of free iodine and relatively high-boiling organic iodides which are difficult to separate from the reaction mixture comprising the desired product, ethylene glycol, by normal distillation techniques. Further, when the distillation step is conducted under a superatmospheric pressure, which pressure is defined with particularity in the Skärblom patent, temperatures in excess of 200°C. are reached in the bottom of the distillation zone. The relatively high temperatures in the zone which normally contains relatively small amounts of water, produce degradation of product and the rapid dehydration of the latter ethylene glycol product to the less desirable high-boiling diethylene glycol and triethylene glycol by-products.

It is, therefore, a principal object of the invention to overcome the aforementioned difficulties and to provide ethylene glycol of markedly reduced high-boiling components. It is another object of the invention to provide a process for preparing ethylene glycol of both markedly reduced, high-boiling, polyethylene glycol as well as the absence of free iodine and organic iodide components. Other objects and advantages can be readily ascertained from a reading of the ensuing description.

To these ends, it has been unexpectedly found that the presence of high-boiling polyethylene glycols can be reduced by providing for at least one reaction zone and a separate distillation zone in which the reaction in the appropriate reaction zone is carried out at elevated temperatures and superatmospheric pressures, followed by a subsequent distillation step which is carried out at subatmospheric pressures. Moreover, in providing for a reaction carried out in two separate and distinct reaction zones involving the utilization of superatmospheric pressure in each of the reaction zones followed by a distillation step utilizing a separate zone maintained under subatmospheric pressures, the rates of formation of high-boiling polyethylene glycols are markedly reduced while simultaneously recovering the desired ethylene glycol, free of iodine and organic iodide compounds.

According to the process of the invention, there is employed in one embodiment a stirred autoclave reactor in which substantially stoichiometric quantities of ethylene, oxygen, and water are all added continuously to said reactor in which is maintained a catalytically effective quantity of iodine and organic iodides dissolved in water. The autoclave reactor, which is fabricated of any suitable material, such as tantalum or Hastelloy C, is pressurized utilizing (a) pressures ranging from about 50 psi. to 1,000 psi. and, preferably, from 200 psi. to 500 psi., and (b) at temperatures ranging from 75°C. to 175°C. and, preferably, from 100°C. to 150°C. The reaction products are next fed to a separate distillation zone maintained at a bottoms temperature ranging from 50°C. to 190°C. under subatmospheric pressures ranging from about 1 mm. Hg. to about 700 mm. Hg. In this manner, there is recovered as a bottoms stream, ethylene glycol, containing markedly reduced amounts of diethylene glycol and triethylene glycol.

In another and preferred embodiment of the invention as illustrated in the accompanying drawing, there is added water through line 1 to a first stirred autoclave reactor 2 maintained at a pressure between 50 psi. and 1,000 psi. and, preferably, between 200 psi. and 500 psi. and at a temperature from about 75°C. to about 175°C., a small, but effective, amount of an iodine-containing catalyst dissolved in water fed through line 3. To the reactor 2 is then added through line 4 a major amount of oxygen, say between 70% and 98%, of the stoichiometric amount of oxygen (i.e., from 0.350 mole to 0.490 mole of oxygen per mole of ethylene) required to carry out the overall ethylene-oxygen-water reaction noted above. Liquid is continuously withdrawn from the first reactor 2 through line 5 and fed to a second stirred autoclave reactor 6 maintained within the same temperature and pressure ranges as described for the first reactor. The balance of oxygen, namely between about 0.010 and 0.150 mole of oxygen which amounts to between about 2% and 30%, based on the stoichiometric amount necessary to carry out the reaction above-indicated, is continuously fed to the second reactor 6 through line 7. There is also added ethylene through line 8 to the second reactor 6, and the contents of the second reactor are admixed by stirring. Any unreacted, unconverted ethylene is fed through line 9 as recycled gas from the top of the second reactor 6 to the top of the first reactor 2.

The liquid contents in the second reactor 6 are continuously discharged through line 10 to a distillation zone 11 in which there is effected a separation between (a) lower-boiling constituents consisting essentially of water and iodine-containing catalyst, which constituents are removed as overhead condensates through line 3 which are recycled to the first reactor 2, and (b) an ethylene glycol product consisting essentially of ethylene glycol, negligible quantities of iodine and organic iodides, and high-boiling polyethylene glycols, such as diethylene glycol and triethylene glycol, the latter being withdrawn from the bottom of the distillation zone through line 12. The distillation zone is operated at a reduced pressure between about 1 mm. Hg. and 700 mm. Hg.

Generally, the residence times in each reactor may vary between about ¼ and 4 hours. A preferred range is between 0.5 and 1 hour.

It is noted that, in the event contrary to the process of the present invention, the distillation zone is maintained at the same pressure as is maintained in the reaction zone, namely, superatmospheric pressure, the desired ethylene glycol substantially free from iodine and organic iodides as well as diethylene glycol and triethylene glycol, is surprisingly not obtained. Resort to difficult separations and purifications becomes necessary so as to obtain a more pure ethylene glycol product. Advantageously, the process of the present invention obviates this difficulty, resulting in a highly desirable, substantially pure ethylene glycol without resort to difficult separations and additional processing.

In general, the catalyst employed in the process of the invention is either iodine per se or an iodine compound in which the iodine is loosely combined. Illustrative of such iodine compounds are: hydrogen iodide, ethylene diiodide, iodoethanol, and equivalents of the same as well as mixtures thereof. Relatively small amounts of iodine are added during reaction to maintain the required iodine level. The iodine quantity is maintained within the range of 0.1 to 1.0 pound iodine per pound ethylene consumed per hour.

For a more complete understanding of the present invention, the following examples are presented for purposes of illustration and are not to be taken as being limitative of the invention. Unless otherwise stated, the parts are by weight.

EXAMPLE 1

To a one-liter, high-pressure Hastelloy C autoclave reactor equipped with a magnetically driven, gas-dispersion-type agitator and internal cooling coil are fed oxygen, ethylene water, and iodine supplied at a rate of 0.003 pound per hour of iodine, 0.07 pound per hour of oxygen, 0.15 pound per hour of ethylene, and 0.07 pound per hour of water. In addition, a recycle aqueous solution of iodine compounds, obtained from a subsequent distillation step containing 1.2 pounds per hour of water and approximately 0.04 pound per hour of iodine, is fed to the reactor. This reactor is operated at a temperature of 125°C. and at a pressure of 250 psi. Resultant reaction product stream is continuously withdrawn from the reactor as a liquid, which liquid is fed to a distillation zone maintained at a bottoms temperature of 142°C. and at a subatmospheric pressure of 100 mm. Hg.

The reaction product stream comprises 1.2 pounds per hour of water, 0.007 pound per hour of iodine, 0.007 pound per hour of diiodoethane, 0.08 pound per hour of iodoethanol, 0.25 pound per hour of ethylene glycol, 0.02 pound per hour of diethylene glycol, and 0.003 pound per hour of triethylene glycol. When the reactor stream is continuously fed to a distillation zone as above-described, water and lower-boiling point organic iodides in the feed distill overhead and are recycled to the reaction zone. Ethylene glycol and higher-boiling glycols are recovered as bottoms having the following composition: 0.25 pound per hour of ethylene glycol, 0.02 pound per hour of diethylene glycol, and 0.003 pound per hour of triethylene glycol, as well as 0.003 pound per hour of iodine in the form of both free iodine and organic iodides.

The overall process is operated continuously for more than 48 hours without any necessity to halt or otherwise interrupt the procedure. Based on ethylene consumed, there is recovered 75% ethylene glycol, 7% diethylene glycol, and 1% triethylene glycol, along with 17% unconverted ethylene.

EXAMPLE 2

This example illustrates a procedure analogous to the prior art.

Repeating Example 1 in every detail except that the distillation zone is operated at the same pressures at which the reaction zone is maintained, there are obtained lesser amounts of ethylene glycol and larger amounts of diethylene glycol and triethylene glycol as compared to the composition obtained in Example 1 above. Thus, the components in the bottom of the distillation zone which are recovered analyze as follows: 0.17 pound per hour of ethylene glycol, 0.08 pound per hour of diethylene glycol, 0.02 pound per hour of triethylene glycol, and 0.003 pound per hour of iodine in the form of free iodines and organic iodides.

There is recovered, based on the ethylene consumed, 49% ethylene glycol, 27% diethylene glycol, and 7% triethylene glycol.

EXAMPLE 3

This example is analogous to Example 1. However, in this example, there is provided a second reaction zone of approximately 0.5 liter capacity, which zone is positioned between the first reaction zone having a one-liter capacity and the distillation zone as described in Example 1 above. Each of the reaction zones is operated at a pressure of about 250 psi. and a temperature of 125°C. The distillation zone is operated at about 100 mm. Hg. The total feed rates of each of the reactants are the same as in Example 1 above. However, the catalyst loss in the reaction product is markedly reduced, and no iodine need be added to the system other than a recycle aqueous solution of iodine compounds obtained from a subsequent distillation step and containing 1.2 pounds per hour of water and approximately 0.04 pound per hour of iodine.

The order of addition in this example is of critical import. All the ethylene reactant is added to the second reaction zone, but water containing the catalyst and approximately 95% of the oxygen (i.e., 0.475 mole of oxygen per mole of ethylene) are added to the first reaction zone and the balance, 5% oxygen, (i.e., 0.025 mole of oxygen per mole of ethylene), is added to the second reaction zone. The addition of ethylene to the second zone insures the conversion of iodine to low-boiling organic iodides, particularly iodoethanol, so that the amount of any free iodine and iodine bound as high-boiling organic iodides which are fed from the second reactor to the distillation zone is substantially reduced. The composition of the overall reaction mixture in which the low-boiling organic iodides are fed to the distillation zone comprises the following composition: 1.2 pounds per hour of water, 0.0002 pound per hour of iodine, 0.007 pound per hour of diiodoethane, 0.08 pound per hour of iodoethanol, 0.25 pound per hour of ethylene glycol, 0.02 pound per hour of diethylene glycol, and 0.003 pound per hour of triethylene glycol.

The yield of ethylene glycol is substantially the same as in Example 1 above.

When the aforementioned product stream is distilled under reduced pressure of 100 mm. Hg. and a bottoms temperature of 142°C., the product contains negligible free iodine and organic iodides; and the amount of ethylene glycol recovered, along with the higher glycols, is the same as indicated in Example 1 above.

EXAMPLE 4

Repeating the procedure of Example 3 in every detail except that the distillation zone is maintained at the superatmospheric pressures of the reactors, there is obtained as a product stream a composition which analyzes as follows: 0.17 pound per hour of ethylene glycol, 0.08 pound per hour of diethylene glycol, 0.02 pound per hour of triethylene glycol, and substantially undetectable free iodine and organic iodides.

I claim:

1. In a process for preparing ethylene glycol which comprises bringing into reactive combination ethylene, water and oxygen in substantially stoichiometric amounts in at least two reaction zones maintained at an elevated temperature and under superatmospheric pressure in the presence of an aqueous iodine-containing catalyst for said reaction, distilling the latter reaction mixture and recovering ethylene glycol from said reaction mixture, the improvement which comprises the steps of: adding from about 0.350 to 0.490 mole of oxygen and an aqueous solution of a catalytic iodine-containing compound selected from the group consisting of iodine, hydrogen iodide, ethylene diiodide, iodoethanol and mixtures thereof dissolved in at least 1 mole of water to a first reaction zone, introducing about 1 mole of ethylene and about 0.010 to 0.150 mole of oxygen to a second reaction zone, the amount of oxygen in both zones being equal to about 0.5 mole, withdrawing unreacted ethylene from the second reaction from overheads and introducing the same into the said first reaction zone, withdrawing from the first reaction zone a mixture of relatively high boiling organic iodides, iodine and ethylene glycol, introducing the latter mixture into said second reaction zone while maintaining said reaction zones at temperatures ranging from between 75°C. and 175°C. and pressure ranging from between 50 psi. and 1,000 psi. in each of said reaction zones, withdrawing a mixture of low boiling iodides and ethylene glycol as bottoms from the second reaction zone, subjecting the latter to distillation under a subatmospheric pressure at a bottoms temperature of from 50°C. to 190°C.

2. The process of claim 1 wherein there is present in the first reaction zone 0.475 mole of oxygen and in the second reaction zone there is present 0.025 mole of oxygen.

* * * * *

UNITED STATES PATENT OFFICE
CERTIFICATE OF CORRECTION

Patent No. 3,928,474    Dated December 23, 1975

Inventor(s) John Maurice Witheford

It is certified that error appears in the above-identified patent and that said Letters Patent are hereby corrected as shown below:

Column 6, line 28, after the phrase "190°C." insert the following:

-- withdrawing as an overhead low boiling iodine compounds which are recycled to the first reaction zone, and recovering as bottoms an ethylene glycol product of markedly improved purity substantially devoid of iodine-containing catalyst. --

Signed and Sealed this sixth Day of April 1976

[SEAL]

Attest:

RUTH C. MASON
Attesting Officer

C. MARSHALL DANN
Commissioner of Patents and Trademarks